United States Patent
Holmdahl et al.

(10) Patent No.: US 11,023,688 B1
(45) Date of Patent: Jun. 1, 2021

(54) GENERATION OF TEXT TAGS FROM GAME COMMUNICATION TRANSCRIPTS

(71) Applicant: Roblox Corporation, San Mateo, CA (US)

(72) Inventors: Eric Holmdahl, San Mateo, CA (US); Nikolaus Sonntag, San Mateo, CA (US); Aswath Manoharan, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 16/884,822

(22) Filed: May 27, 2020

(51) Int. Cl.
*G06F 15/00* (2006.01)
*G06F 40/40* (2020.01)
*A63F 13/87* (2014.01)
*G06F 16/245* (2019.01)

(52) U.S. Cl.
CPC .............. *G06F 40/40* (2020.01); *A63F 13/87* (2014.09); *G06F 16/245* (2019.01)

(58) Field of Classification Search
CPC ......... A63F 13/87; G06F 16/245; G06F 40/40
USPC .......................................................... 704/9
See application file for complete search history.

(56) References Cited

U.S. PATENT DOCUMENTS

| | | | | |
|---|---|---|---|---|
| 5,613,909 A * | 3/1997 | Stelovsky | ............. | A63F 13/005 463/1 |
| 8,360,873 B1 * | 1/2013 | Wickett | .................. | A63F 13/79 463/29 |
| 8,545,330 B2 * | 10/2013 | Wickett | .............. | G07F 17/3267 463/42 |
| 9,517,413 B1 * | 12/2016 | Wickett | .............. | G07F 17/3279 |
| 9,607,016 B1 * | 3/2017 | Wickett | .................. | A63F 13/12 |
| 10,363,488 B1 * | 7/2019 | Willette | .................. | A63F 13/86 |
| 10,853,375 B1 * | 12/2020 | Alyea | ...................... | A63F 13/79 |
| 2009/0163272 A1 * | 6/2009 | Baker | ..................... | A63F 13/12 463/29 |
| 2012/0226696 A1 * | 9/2012 | Thambiratnam | ..... | G06F 16/951 707/738 |
| 2013/0029760 A1 * | 1/2013 | Wickett | .............. | G07F 17/3293 463/29 |
| 2013/0029766 A1 * | 1/2013 | Wickett | ................ | G07F 17/326 463/42 |
| 2014/0031132 A1 * | 1/2014 | Wickett | .................. | A63F 13/85 463/42 |
| 2015/0170642 A1 * | 6/2015 | Peng | ..................... | G10L 15/187 704/235 |
| 2017/0165579 A1 * | 6/2017 | Wickett | .............. | G07F 17/3293 |
| 2018/0345152 A1 * | 12/2018 | Duan | .................. | G06F 16/7867 |

(Continued)

*Primary Examiner* — Khai N. Nguyen
(74) *Attorney, Agent, or Firm* — IP Spring

(57) ABSTRACT

Some implementations relate to methods, systems, and computer-readable media to generate text tags for games. In some implementations, a computer-implemented method to generate one or more text tags includes obtaining a plurality of chat transcripts, each chat transcript associated with a respective gameplay session of a respective game of a plurality of games. Each chat transcript includes content provided by participants in the gameplay session. The method further includes programmatically analyzing the plurality of chat transcripts to determine one or more characteristics for each game of the plurality of games, and generating a text tag for at least one game of the plurality of games based on the one or more characteristics of the at least one game.

21 Claims, 8 Drawing Sheets

(56) References Cited

U.S. PATENT DOCUMENTS

2019/0299104 A1* 10/2019 Rout .................... H04N 21/233
2020/0282315 A1* 9/2020 Daniel .................... A63F 13/67

* cited by examiner

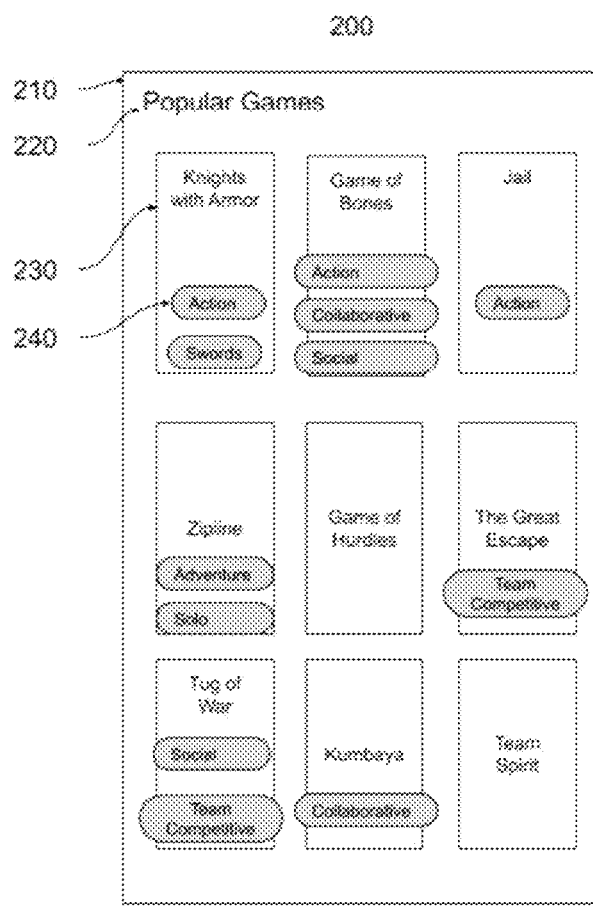
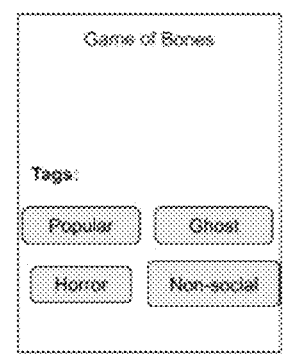
FIG. 2B
FIG. 2A
FIG. 2C

US 11,023,688 B1

GENERATION OF TEXT TAGS FROM GAME COMMUNICATION TRANSCRIPTS

TECHNICAL FIELD

Embodiments relate generally to computer-based gaming, and more particularly, to methods, systems, and computer readable media to generate text tags for games.

BACKGROUND

Some online gaming platforms enable users to connect with each other, interact with each other (e.g., within a game), create games, and share information with each other via the Internet. Users of online gaming platforms may participate in multiplayer gaming environments (e.g., in virtual three-dimensional environments), design characters and avatars, decorate avatars, exchange virtual items/objects with other users, communicate with other users using audio or text messaging, and so forth.

Users may browse and/or search for games based on their interests to discover suitable games for playing. For example, users may browse games by categories (e.g., action, racing, puzzle, strategy, popular, trending, new, etc.) or search games by keywords or concepts (e.g., "car chase," "board game," etc.).

SUMMARY

Implementations described herein relate to generation of text tags. In some implementations, a computer-implemented method to generate one or more text tags includes obtaining a plurality of chat transcripts, each chat transcript associated with a respective gameplay session of a respective game of a plurality of games, programmatically analyzing the plurality of chat transcripts to determine one or more characteristics for each game of the plurality of games, and generating a text tag for at least one game of the plurality of games based on the one or more characteristics of the at least one game. In some implementations, each chat transcript includes content provided by participants in the gameplay session.

In some implementations, the method further includes providing a user interface that enables users to browse or search games, and the user interface includes a plurality of games and corresponding text tags.

In some implementations, programmatically analyzing the plurality of chat transcripts to determine one or more characteristics of the each game includes determining a numerical metric associated with the each game. In some implementations, determining the numerical metric includes determining a number of messages in each of the plurality of chat transcripts. In some implementations, the numerical metric is based on the number of messages. In some implementations, determining the number of messages includes determining the number of messages in each transcript per time period or the number of messages in each transcript by each participant.

In some implementations, programmatically analyzing the plurality of chat transcripts to determine one or more characteristics of the each game includes determining a social metric associated with the each game based on the plurality of chat transcripts. In some implementations, determining the social metric includes determining a number of words in each message of each of the chat transcripts. In some implementations, the social metric is based on the number of words.

In some implementations, determining the social metric includes performing text analysis of each message of each of the chat transcripts. In some implementations, programmatically analyzing the plurality of chat transcripts includes applying a trained machine learning model to obtain the one or more characteristics for the each game.

In some implementations, the one or more text tags includes a tag indicative of a social game if the one or more characteristics of the each game meets a social game threshold. In some implementations, the method further includes determining a level of collaboration and a level of competition between the game participants based on the one or more characteristics of the each game. In some implementations, generating the one or more text tags is based on the level of collaboration and the level of competition.

In some implementations, the method further includes calculating a reception level for the each game based on a count of game participants that view one or more chat messages in a chat transcript associated with the each game. In some implementations, the game includes a virtual environment. In some implementations, game participants included in the count of game participants are associated with avatars that are located in a same region of the virtual environment.

In some implementations, programmatically analyzing the plurality of chat transcripts includes determining statistical parameters based on a number of messages in each of the plurality of chat transcripts. In some implementations, the statistical parameters include one or more of a mean, a median, or a mode of the number of messages associated with each game participant. In some implementations, the method further includes determining a level of participation of game participants based on the statistical parameters.

Some implementations include a non-transitory computer-readable medium with instructions that, responsive to execution by a processing device, causes the processing device to perform operations comprising obtaining a plurality of chat transcripts, each chat transcript associated with a respective gameplay session of a respective game of a plurality of games, programmatically analyzing the plurality of chat transcripts to determine one or more characteristics for each game of the plurality of games, and generating a text tag for at least one game of the plurality of games based on the one or more characteristics of the at least one game.

In some implementations, each chat transcript includes content provided by participants in the gameplay session. In some implementations, the text tag is indicative of a type of the game or a style of game play.

Some implementations include a system that includes a memory with instructions stored thereon, and a processing device, coupled to the memory, the processing device configured to access the memory and execute the instructions. In some implementations, the instructions cause the processing device to perform operations including obtaining a plurality of chat transcripts, each chat transcript associated with a respective gameplay session of a respective game of a plurality of games, programmatically analyzing the plurality of chat transcripts to determine one or more characteristics for each game of the plurality of games, and generating a text tag for at least one game of the plurality of games based on the one or more characteristics of the at least one game.

BRIEF DESCRIPTION OF THE DRAWINGS

FIG. 2A illustrates an example listing of games annotated with text tags, in accordance with some implementations.

FIG. 2B illustrates an example tag-wise listing, in accordance with some implementations.

FIG. 2C illustrates another example of a tag-wise listing, in accordance with some implementations.

DETAILED DESCRIPTION

Figure 1:
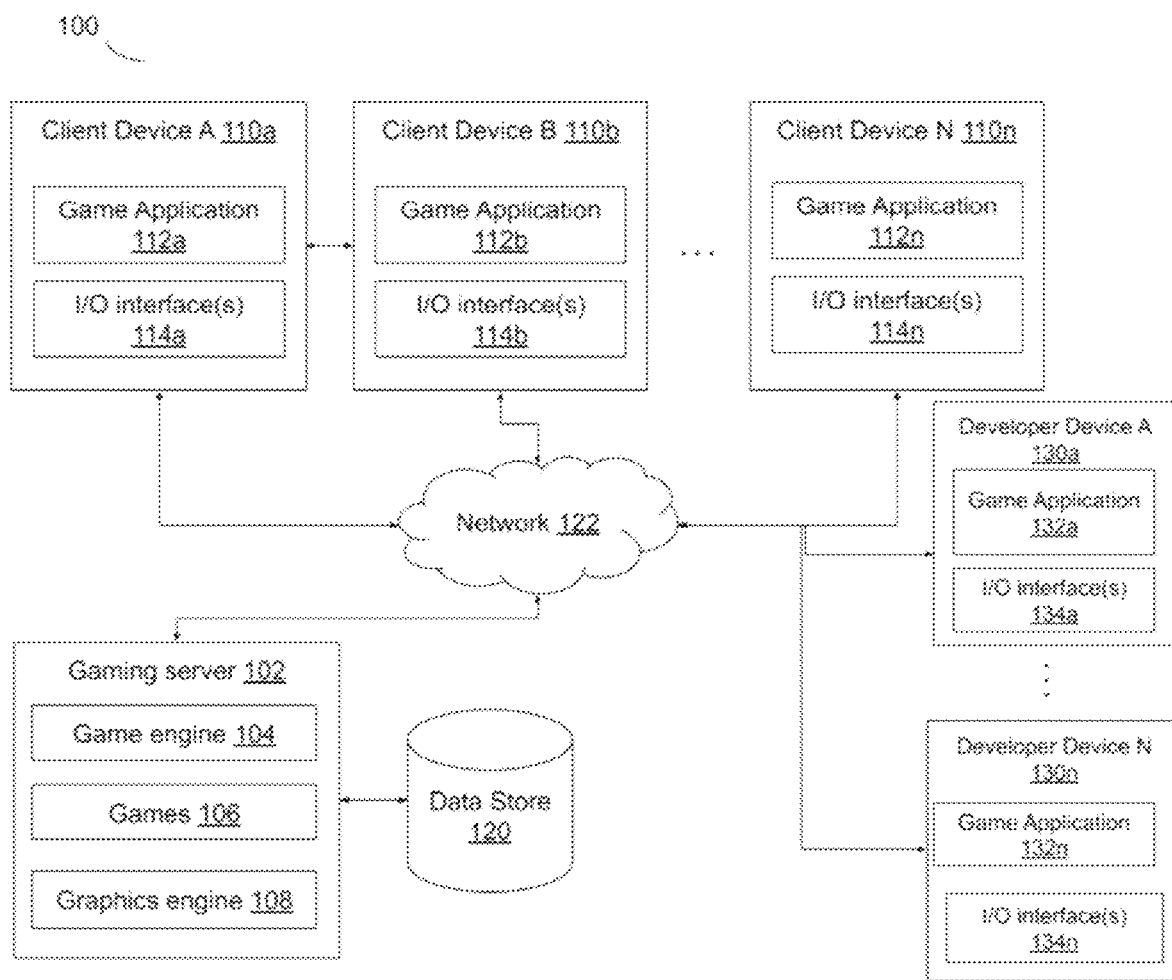
FIG. 1 is a diagram of an example system architecture to generate text tags, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online gaming platform may also allow users (developers) of the platform to create new games and/or characters. For example, users of the online gaming platform may be enabled to create, design, and/or customize new characters (avatars), new animation packages, and make them available to other users.

Users may play games in gameplay sessions as solo participants, and/or in groups. Multiple instances of gameplay sessions of a game may be initiated at the same time, and at different times by a player or groups of players. A user may participate in multiple gameplay sessions of the same game or participate in gameplay sessions of different games at the same time. Users may include playing participants as well as observer (viewer) participants. During gameplay sessions, participants may communicate with one another via a variety of communication channels (ways) such as text messaging, group chats (e.g., publicly viewable chats), voice messages, etc.

The communication channels can include platform-enabled chat which is a channel provided through the game platform. In such a channel, all communication between participants are typically routed through the platform, e.g. via a gaming server.

The communication channels can also include platform-enabled audio communication. The game platform may additionally support voice communication by providing services such as speech-to-text, subtitles, sign language support etc. A record of all or some of user communications can be stored on storage devices and/or media associated with the game platform.

Games may be categorized based on their type and/or gameplay style. In some implementations, games can be organized by one or more of gameplay characteristics, objective (of the game) type, and subject type (for example, sports, challenge, action, or racing). The category may be labeled by one or more text tags associated with the game.

Other users (players) may discover games to play by browsing or based on a search. The search may be performed by name or by category, and the user may select a game they wish to play based on a list of games displayed. In some implementations, games likely of interest to the player are surfaced and displayed to the user, for example, at a time of login to the game platform or resumption of a session at the game platform by a player.

Game players and game platform owners benefit from associating suitable text tags to various games. Labeling of games by utilizing text tags can enable efficient discovery of games by users and thus provide a better user experience on the game platform. The text tags can be utilized for ranking of games on the game platform and/or as input to recommender models, e.g. machine learning models, utilized on the game platform. For example, the recommender models can generate game recommendations for users based on text tags associated with games.

In some implementations, one or more of the text tags may be related to a social level of a game. Tags related to the social level of the game may be utilized to recommend games to users based on content and a type of the social level of game that they generally play and/or like. For example, a user who primarily plays single player games with little social interaction can be recommended other single player games or low interaction games, while users who typically play high socialization games, e.g., games where there is chat interaction between multiple game players, can be recommended other social games. The text tags indicative of the social level may be provided to machine learning models (e.g., a neural network based model) that provide game recommendations to users. A technical problem for game platform operators is the accurate labeling and discoverability of games across the game platform(s).

A recognized benefit of gaming is the socialization that it provides to players who are enabled via game sessions (gameplay sessions) to interact and communicate with other players and participants across multiple geographies. Some games may provide opportunities for friends to play together and have a social interaction within the platform. The game platform can track a social metric or a friendship metric for each game based on a frequency and nature of social interaction between participants.

When the games are user-generated and the platform includes many user-generated environments, the game platform may have limited information about the games. The nature of gameplay sessions provides challenges to their observability since it may not be easy to automatically observe game events and determine sociability and nature of social interactions, since the gameplay data varies based on the game design.

Some users (game developers) may not provide tags for games that they make available via the platform, or may provide tags that do not sufficiently aid discovery of the game by players that use the game platform. In some cases, users may intentionally incorrectly label a game with a view to get increased player traffic to their game. Tags that are manually assigned to a game (e.g. by a developer) can be evaluated by comparison with generated text tags for the game to determine manually assigned tags that are incorrect or irrelevant. Upon such evaluation, incorrect or irrelevant tags may be suppressed, e.g., hidden and/or removed from association with the game. Suppression of manually assigned tags in this manner can help ensure that player traffic to a game is genuine, based on the quality of the game and relevance of the game to a player's interests. This can lead to a higher proportion of game play sessions that players enjoy, and reduce the number of short (e.g., less than 1 minute) or unsatisfactory sessions that may occur due to incorrect or irrelevant labels.

Some embodiments disclosed herein automatically determine text tags that may be associated with various games on the game platform. The text tags thus determined can be associated with the game.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, client devices 110a, 110b, and 110n (generally referred to as "client device(s) 110" herein), and developer devices 130a and 130n (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device.

Online gaming server 102 can include, among other things, a game engine 104, one or more games 106, and graphics engine 108. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a game application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a website (e.g., a webpage) or application back-end software that may be used to provide a user with access to content provided by online gaming server 102. For example, users may access online gaming server 102 using the game application 112 on client devices 110.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). With user permission, a record of some or all user communications may be stored in data store 120 or within games 106. The data store 120 may be utilized to store chat transcripts (text, audio, images, etc.) exchanged between players.

In some implementations, the chat transcripts are generated via game application 112 and/or game application 132 or and are stored in data store 120. When the user permits storage of chat transcripts, the chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual game environment, accessories utilized by game participants, etc. In some implementations, the chat transcripts may include multilingual content, and messages in different languages from different gameplay sessions of a game may be stored in data store 120.

Users are provided with controls to determine what chat information is stored and how long the information is stored. For example, a user can select to set the chat information storage to expire at certain times, e.g., at the end of a game session, upon logging out from the game platform, every 24 hours, every week, etc. In some implementations, e.g., when the user denies permission, or when the chat is encrypted, no chat data may be stored. In these implementations, chat metadata such as start and end times, participant counts, participant identifiers, game and game session identifiers, etc. may be stored, as permitted by the user.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environment of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106.

For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual objects" or "virtual game item(s)" herein) may refer to objects that are used, created, shared or otherwise depicted in game applications 106 of the online gaming server 102 or game applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online gaming server 102 hosting games 106, is provided for purposes of illustration. In some implementations, online gaming server 102 may host one or more media items that can include communication messages from one user to one or more other users. With user permission and express user consent, the online gaming server 102 may analyze chat transcripts data to improve the game platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associated the specific user(s) with a game 106 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110/116, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction(s) for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 122 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 130 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the client device(s) 130 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

FIG. 2A illustrates an example listing of games annotated with text tags, in accordance with some implementations. The listing is displayed via a user interface (UI) that includes different games available on a game platform to a user.

Game lists may be generated (for example, by online gaming server 102) from available games on a game platform to enable game selection by users. Statistics of gameplay, number of users playing different games, engagement level of users, game types, etc. may be utilized to determine game popularity.

In some implementations, categories (220) of games may be promoted (highlighted) to users. An example category may include popular games (220), as depicted in FIG. 2. Other examples may include top social games, top adventure games, and games recommended for a user, etc. Each category may include a list of individual games (for example, 230). Individual games may also be annotated with tags (240) that may be displayed along with an icon or other display associated with a game. In some implementations, the game lists may be provided on an initial display of a user device via a user interface.

Games may also be associated with tags indicative of features associated with and included in the games. For example, games may be associated with tags such as tycoon game, obstacle course game, first person shooter game, collaborative game, social game, etc. that can enable a user to obtain additional information about the type of game. Multiple tags may be associated with games that are associated with a first category and games with a second tag can be associated with multiple categories. For example, a category of games titled "Racing Games" may include games with example tags "city race," "jungle race," "desert race," "camel race," etc.

In some implementations, games may be categorized into various game categories based on their genre or tags associated with the game (adventure game, social game, etc.). Multiple text tags or categories may be assigned to a game. In some implementations, the nature of gameplay interaction may be utilized to categorize the games. In some implementations, example categories for a game may include action, adventure, fighting, platform, puzzle, racing, role-playing, shooter, simulation, sports strategy, etc. In some implementations, a category associated with a game may be based on a social level of the game. The social level of the game may be used to generate tags such as chat based game (e.g., a game in which game play includes chat between game players), single player/multi player game, or chat enabled game (e.g., a game in which game play is distinct from chat, but where players are enabled to chat with each other while playing the game), etc. In some implementations, a game may be associated with a combination of social level, gameplay, and theme based tags.

Highlighting games may enable users to easily browse available games, discover game(s) of interest to them, and make a selection of their preferred game from all available games on the platform.

In some implementations, games may be categorized into various game categories based on their genre or tags associated with the game (adventure game, social game, etc.). Multiple text tags or categories may be assigned to each game.

In some implementations, the text tags may include a social metric indicative of a degree of social interaction associated with the game. In some implementations, the social metric may be a number that is indicative of the degree of social interaction associated with the game. For example, in some implementations, the social metric may be a number between 0 and 1, where a value of 0 for the social metric is indicative of the game being non-social and a value of 1 for the social metric is indicative of the game being highly social.

In some implementations, the social metric may be a descriptor that is indicative of the degree of social interaction associated with the game. For example, in some implementations, the social metric descriptors could be terms such as "non-social," "somewhat-social," "highly-social," "competitive-social," "collaborative-social," etc.

Game platforms include many types of games as part of their offering, and different games may appeal to different users, and to a given user at different times. The text tags and social metric may be utilized to suggest games to participants based on a predicted user preference that is based on the games that they user has previously played. A user interface may be provided that enables users to browse or search games and includes a plurality of games and corresponding text tags.

In some implementations, the nature of gameplay interaction may be utilized to categorize the games. In some implementations, example categories for a game may include action, adventure, fighting, platform, puzzle, racing, role-playing, shooter, simulation, sports strategy, etc.

In some implementations, game categories may include a location setting, a genre, and/or a theme for the game, e.g. western, town and country, city, downtown, space, etc.

In some implementations, example categories for a game may include the type(s) of device that is well-suited to play the game. For example, a game may be labeled as suitable for desktop, mobile, virtual reality (VR), etc.

In some implementations, the text tags are associated with the game and displayed in a user interface. In some implementations, the text tags are utilized to group together games with similar text tags. In some implementations, the text tags are associated with a game, and searchable by a user when the user is searching for a certain type of game.

FIG. 2B illustrates an example tag-wise listing, in accordance with some implementations. In this illustrative example, the user interface (UI) displays a game or game icon along with all its associated tags. With this UI view, a participant may browse game details and obtain information about all the tags associated with the game.

FIG. 2C illustrates another example of a tag-wise listing, in accordance with some implementations. In this illustrative example, the user interface displays a list of all or multiple games (or game icons) that are associated with a given tag. This UI view can enable a participant to browse for games that are associated with a tag of interest to the participant.

Figure 3:
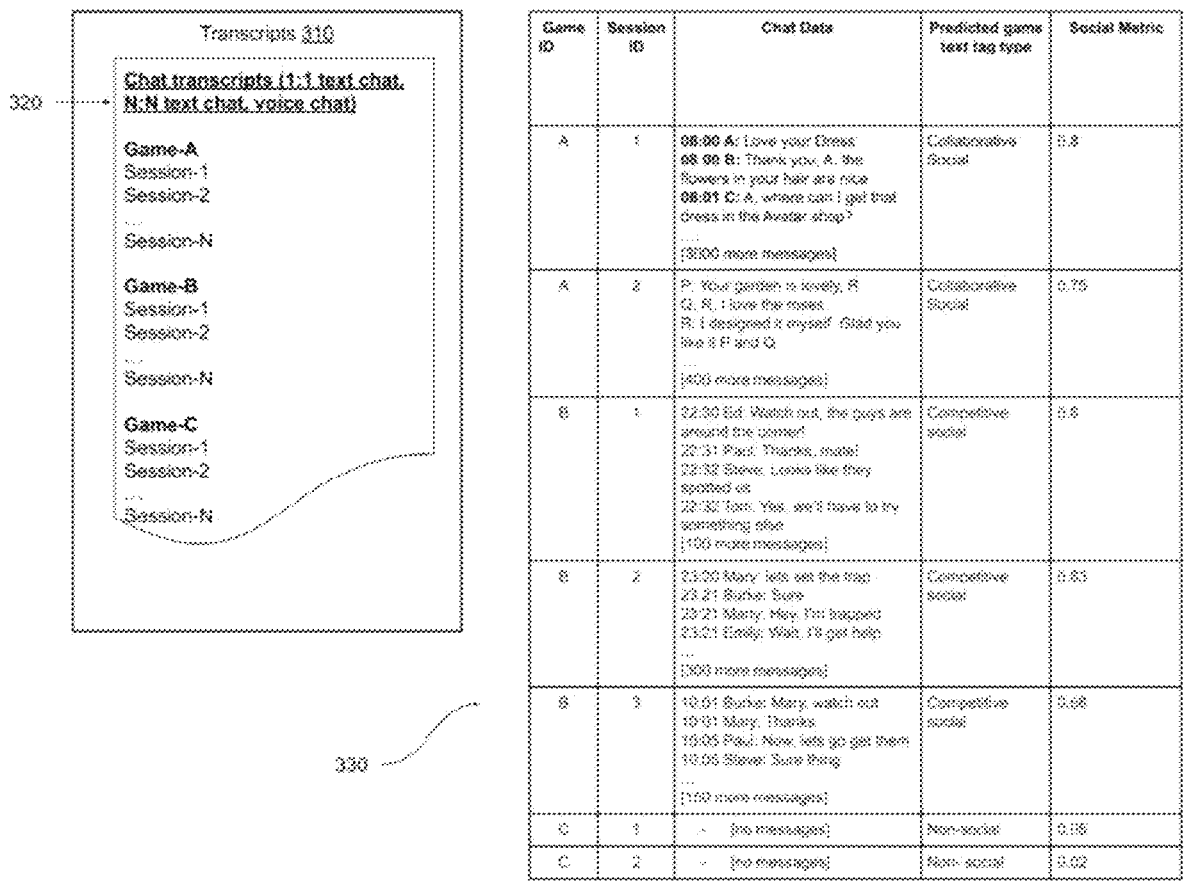
FIG. 3 is a diagram illustrating an example database and table of chat transcripts, in accordance with some implementations.

FIG. 3 is a diagram illustrating an example database and table of chat transcripts, in accordance with some implementations.

FIG. 3 depicts an example database 310 that is utilized to store chat transcripts 320. The chat transcripts 320 may include chat transcripts of communication(s) between game participants as described with reference to FIG. 1. Chat transcripts 320 are stored and accessed with specific user permission from participants in the chat conversation.

Database 310 may be part of data store 120, or may be a separate database. In some implementations, the gaming platform may be a type of social network providing connections between users or a type of user-generated content system that allows users (e.g., end-users or consumers) to communicate with other users on the gaming platform, where the communication may include voice chat (e.g., synchronous and/or asynchronous voice communication), video chat (e.g., synchronous and/or asynchronous video communication), or text chat (e.g., synchronous and/or asynchronous text-based communication).

The chat transcripts can include a variety of user communication transcripts, e.g. transcripts of private messages (1:1 messages) between game participants, transcripts of group chat messages (N:N messages) between groups of game participants, transcripts of voice communication messages between game participants, etc., obtained and analyzed with express user consent and/or permission. For example, a user can choose to deny use of certain chat data (e.g., 1:1 messages) and allow access to other chat data (e.g., chat metadata of 1:1 chat, chat data of N:N chat) etc. Further, chat transcripts can be processed to remove personally identifiable information, e.g., userID or username, etc. prior to storage and/or use. For example, while FIG. 3 shows individual user identifiers (e.g., Ed, Paul, Steve, Tom, etc.), such identifiers can be removed and replaced with randomly generated identifiers. Further, the randomly generated identifiers can be generated such that the same user is assigned a different identifier for chat activity within different game sessions or games. A database (for example, data store 120 described with respect to FIG. 1) can be used to store chat transcripts of each game session of multiple games on the platform. Each transcript is associated with a corresponding game and game session.

FIG. 3 also depicts example records 330 of database 310 that includes the transcripts. The chat transcripts can include fields such as a game identifier (game id), session identifier (ID), and detailed chat transcripts including messages originating from different participants, participant name and/or identifier, message timestamp, message metadata (e.g., formatting, importance level, etc.), etc.

In this illustrative example, chat transcripts associated with games A, B, and C are depicted. Transcripts of different gameplay sessions associated with each of the games are also depicted. For example, the transcripts include transcripts from gameplay sessions with session IDs 1 and 2 of game A, transcripts from session IDs 1, 2, and 3 of game B, and transcripts from gameplay sessions with session ID 1 and 2 of game C.

In this illustrative example, the chat transcripts from gameplay sessions of game A include user communications such as "Love your Dress," "Thank you, A. the flowers in your hair are nice," and "where can I get that dress in the Avatar shop?" and may be indicative of a game that is "collaborative social." The chat transcripts from gameplay sessions of game B include user communications such as "Watch out, the guys are around the corner," "Thanks, mate!," "Looks like they spotted us," and "Yes, we'll have to try something else" and may be indicative of a game that is "competitive social." In this illustrative example, gameplay sessions from game C includes no user communications, and may be indicative of a "non-social" game.

In some implementations, the chat transcript may also include additional information associated with user communications, e.g. avatars of participants, location of participants within the virtual game environment at the timestamps with user communications, accessories worn by participants, timestamps associated with various user communications, etc. Such information can be stored and/or accessed if the user provides permission. The database of chat transcripts may also include predicted/suggested category tags as part of its records.

In some implementations, a social metric associated with each set of chat transcripts may be determined. The social metric may be a number that is indicative of a degree of social interaction between participants in the game, as determined from an analysis of the chat transcripts.

In some implementations, a level of competition and a level of collaboration in the game may be determined. For example, in a "team competition" type game, multiple teams may compete amongst themselves to reach a goal to determine one or more winners. In another example, in an "individual competition" type game, individual players in the game may compete in their individual capacities to reach a goal. In a "team collaboration" type game, multiple teams may collaborate (work together collaboratively) towards a common goal. In another example, in an "individual collaboration" type game, multiple individuals may collaborate to achieve a common goal within the game.

In some implementations, a game structured around socialization and friendship may be labelled as a "social chat" game. In some implementations, a text tag may be indicative of a language associated with a game, e.g. Russian game, Spanish game, etc. The language of the chat can be recognized and utilized to produce the tag.

Figure 4:
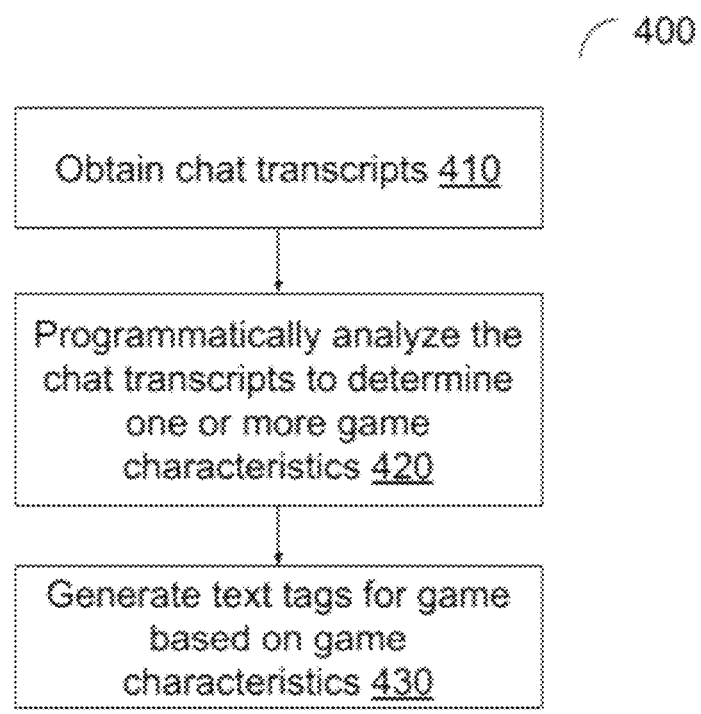
FIG. 4 is a flowchart illustrating an example method to generate text tags from chat transcripts, in accordance with some implementations.

FIG. 4 is a flowchart illustrating an example method 400 to generate text tags from chat transcripts, in accordance with some implementations.

In some implementations, method 400 can be implemented, for example, on gaming server 102 described with reference to FIG. 1. In some implementations, some or all of the method 400 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a datastore 120 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

Method 400 may begin at block 410. At block 410, a plurality of chat transcripts are obtained. Each chat transcript may be associated with a respective gameplay session of a respective game and includes content provided by participants in the gameplay session. Only such chat transcripts are obtained for which the user has provided permission. Further, chat transcripts are processed to remove personally identifiable information (e.g., userID, avatar, etc.) prior to use. Further, certain words or phrases can be removed from the content of chat transcripts, prior to analysis. In some implementations, obtaining chat transcripts can be limited to obtaining chat metadata (e.g., one or more of users participating in a particular chat, timestamps associated with the chat, number of messages in the chat, etc.) In some implementations, certain chat transcripts may be set as "public chats," e.g., where the participating users have indicated permission for all viewers.

In some implementations, based on user permission, the chat transcripts may include one or more of 1:1 chat transcripts, e.g. transcripts of private chat messages between two users, N:N chat transcripts, e.g. group chat messages between all participants in the gameplay session, group chat messages between all participants of a team formed within the gameplay session, and transcripts of voice conversations between participants.

Chat transcripts may include chat transcripts from multiple language versions of the same game. For example, if there are French, German, Hindi, and Russian versions of the same canonical game, the chat transcripts from all the language versions may be collated and analyzed together, as permitted by the participant users in the chat.

In some implementations, with user permission, speech to text technologies may be utilized to convert oral communication streams to text transcripts. In some implementations, a previously transcribed voice communication transcript may be utilized. In some implementations, substantially real-time transcription techniques may be utilized to analyze voice recordings from gameplay sessions.

In some implementations, with user permission, the text transcripts may be normalized by user. For example, chat content associated with a user with a high chat volume may be less significant than another user with a low chat volume. In some implementations, pre-filters may be utilized to filter message type(s) that are common across all game types, and which do not provide specific signals about the game, e.g., greetings such as "hello," "goodbye"; queries such as "how?" "why?"; expressions of emotion such as "rofl," "lol," etc. In some implementations, chat transcripts from botted game sessions (where the game session includes one or more automated players or bots that pretend to be human game players) may be excluded, e.g. a table of identified bots may be utilized to remove chat transcripts from suspect botted sessions from the chat transcripts. In some implementations, botted sessions may be excluded entirely (chat transcript data from the session is excluded from tag generation), or partially (e.g., chat content from and to bots is excluded from analysis for tag generation).

Block 410 may be followed by block 420.

At block 420, with user permission, the plurality of chat transcripts are programmatically analyzed to determine one or more characteristics for each game.

In some implementations, the chat transcripts may be programmatically analyzed to determine one or more numerical metric(s) associated with each game. The numerical metrics may be indicative of message volume within gameplay sessions of the game. The numerical metric associated with the game can include metrics based on a number of messages in each of the plurality of chat transcripts. For example, programmatic analysis of chat metadata can be performed to determine the number of messages in each transcript per time period (for example, number of messages per hour or second of gameplay), the number of messages in each transcript originating from each participant in the gameplay session. For example, a chat transcript from a game with a higher messaging rate and a higher participation rate may be indicative of a game that is more social than a chat transcript of a game with a lower messaging rate and a lower participation rate.

In some implementations, statistical parameters based on a number of messages in each of the plurality of chat transcripts may be computed. For example, one or more of a mean, a median, or a mode of the number of messages associated with each game participant may be determined. A level of participation of game participants may be determined based on the statistical parameters.

The game characteristics can also include a social metric associated with each game. A number of words in each message of the chat transcripts may be utilized to determine a social metric associated with the game.

In some implementations, when access to chat content is permitted by chat participants, the social metric can be determined based on a text analysis of each message of each of the chat transcripts. Text analysis can be performed in conjunction with knowledge graphs that can be utilized to parse the chat transcripts to obtain an interpretation of the text in the chat transcripts. The text analysis generates semantic annotations that link references in the transcripts to specific concepts in the graph.

In some implementations, with user permission, the text analysis can include determining a frequency distribution of words indicative of an extent of social interaction. For example, a histogram of frequency of different words appearing in the chat transcripts may be utilized to determine the social metric based on the frequency of words indicative of the extent of social interaction. For example, a high frequency of words indicative of friendship and similar moods and feelings may be indicative of a level of a social nature of the game that is higher than game with a lower frequency of words indicative of friendship, etc.

Prior to use of the chat features of the gaming platform, users are provided with options to select chat features and set various parameters. For example, the user may choose to participate only in private text chats and set parameters such that the chat data is stored only for the duration of the session, and is not accessible afterwards. In another example, the user may choose to provide permission to access all of their chat activity. Further, storage and/or use of chat data is configured in accordance with platform rules and regulations, e.g., determined based on local government policies in the user's location. In locations where such use is not permitted, no chat data is used, or the chat features of the gaming platform may be turned off entirely.

Block 420 may be followed by block 430.

At block 430, a text tag for at least one game of the plurality of games may be generated based on its characteristics (game characteristics).

In different implementations, the text tag may be utilized for various purposes. In some implementations, the text tag can be stored in a database in association with a game identifier for the game. In these implementations, the stored text tags can be utilized to support game search or browsing. For example, with user permission, a semantic comparison of a user-entered search term (e.g., "social chat") with the stored tags may be performed to identify games that match the user search. In another example, the stored text tags may be used to render a user interface that enables a user to browse games by tags assigned to the game.

In some implementations, the text tags for a game may be utilized to evaluate tags that are manually assigned to a game (e.g., by a game creator). The evaluation may include determination of whether each manually assigned tag are incorrect or irrelevant. Upon such evaluation, incorrect or irrelevant tags may be suppressed, e.g., hidden and/or removed from association with the game. Suppression of manually assigned tags in this manner can help ensure that player traffic to a game is genuine, based on the quality of the game and relevance of the game to a player's interests. This can lead to a higher proportion of game play sessions that players enjoy, and reduce the number of short (e.g., less than 1 minute) or unsatisfactory sessions that may occur due to incorrect or irrelevant labels.

In some implementations, the programmatic analysis of the chat transcripts may include applying a trained machine learning model to determine the characteristics for each game. The ML model generates a set of predicted tags based on the chat transcripts.

In some implementations, the ML model may be an unstructured ML model that utilizes a word embedding architecture that converts words to vectors. For example, the word embedding architecture may be utilized to map words or phrases that appear in the chat transcripts to vectors of real numbers.

In some implementations, the ML model utilizes a mathematical embedding to reduce the dimensionality of the chat transcript space, e.g. from a space that has many dimensions per word to a continuous vector space with a lower dimension. For example, a Bidirectional Encoder Representations from Transformers (BERT) model, FastText model, or a generic Word2Vec model can be applied to the chat transcript text obtained from a game platform to perform a preliminary analysis. Usernames included in the chat transcripts may be replaced with a suitable tag, e.g. [user] or [USER] tag, during the preliminary analysis.

In some implementations, prior to training, a set of chat transcripts may be configured (composed) into blocks of chat that are tagged with groundtruth tags, e.g., obtained from human volunteers. The blocks of chat transcripts may be utilized to train the ML model, e.g. by using a classifier such as a BERT or FastText.

For example, the ML model may determine a feature vector (or embedding) based on the chat transcripts. The feature vector (or embedding) may be a mathematical, multi-dimensional representation generated based on the chat transcripts. Different games may have different feature vectors, based on their respective chat transcripts. The trained ML model generates similar feature vectors for similar games (games that are associated with similar types of chat transcripts).

In some implementations, analysis is based on individual components of the chat transcripts. In some implementations, analysis is based on chat transcripts considered as a whole. The choice of a type of analysis may depend on a context, e.g., if a game has massive quantities of chat data, a quick analysis of individual components may be performed to produce tags quickly. Analysis of chat transcripts as a whole may be performed subsequently.

Similar gameplay from multiple games would include similar chat transcripts in a feature space that is revealed by analyzing the game features using the ML model. The chat transcripts are provided as inputs to the ML model which may derive the feature vector or embedding, and/or cluster games and generate predicted tags associated with the games based on the derived feature vector or embedding.

In some implementations, a social game threshold may be utilized to determine if a game is a social game. A game may be determined to be/labeled as a social game if a combination of the game characteristics and/or the social metric computed for the game meets the social game threshold.

In some implementations, a level of collaboration and a level of competition amongst/between the game participants may be determined based on the game characteristics.

In some implementations, a reception level may be determined for the game. The reception level may be based on a number (count) of game participants that are actively participating, e.g. viewing chat messages sent by other participants, etc. The reception level may be indicative of a level of active participation by participants in the game.

The reception level may be determined over different virtual and/or geographical zones. For example, the reception level may be determined for participants who are located within a certain distance of other participants and be indicative of a level of reception in a localized region (e.g. all game participants located in a certain state, city, or country, etc.). In another example, the reception level may be determined over geographical regions to estimate a level of global reach for the game. In some implementations, the game may include a virtual environment (e.g. all game participants that are virtually collocated on a fictional planet, or all game participants whose avatar is located in a pizza place) and the analysis of chat transcripts includes chat transcripts of participants that are associated with avatars that are located in a same region of the virtual environment.

Virtual zones defined by categories, e.g. participants who have played for a period that exceeds a certain time period, new participants to the platform may be determined. For example, if programmatic analysis of chat transcripts of a game indicates a high participation rate from new participants to the game platform, it may be indicative of the game being a friendly game for new users.

In some implementations, a reception level (or listenership/listen rate) may be determined for different categories of users, e.g. new users, long term players/experienced players, casual/occasional players, etc.

In some implementations, gameplay sessions are clustered into groups, and the analysis includes an analysis of the clustered game session groups. Based on the analysis of the clustered game session groups, text tags for the groups are generated, e.g. social collaborative, team competition, solo, etc. A tag for the game may be generated based on a threshold (minimum number or percentage of sessions) number of groups that fall in a particular cluster In some implementations, a tag or social metric may not be generated if the threshold is not met since it may be indicative of the game not having a distinctive characteristic.

Method 400, or portions thereof, may be repeated any number of times using additional inputs. In some implementations, the text tags may be generated at a predetermined frequency, e.g. daily, weekly, etc. In some implementations, method 400 may be triggered by game updates.

In some implementations, method 400, or portions thereof, may be repeated based on game content updates, e.g. codebase change to the game, changes to game digital assets, etc. In some implementations, method 400, or portions thereof, may be repeated based on game status updates, e.g. upon a certain number of new gameplay sessions in a particular time period, upon a certain number of new gameplay sessions since a previous analysis of chat transcripts, etc. In some implementations, method 400, or portions thereof, may be repeated based on changes in gameplay statistics of games on the game platform.

Figure 5:
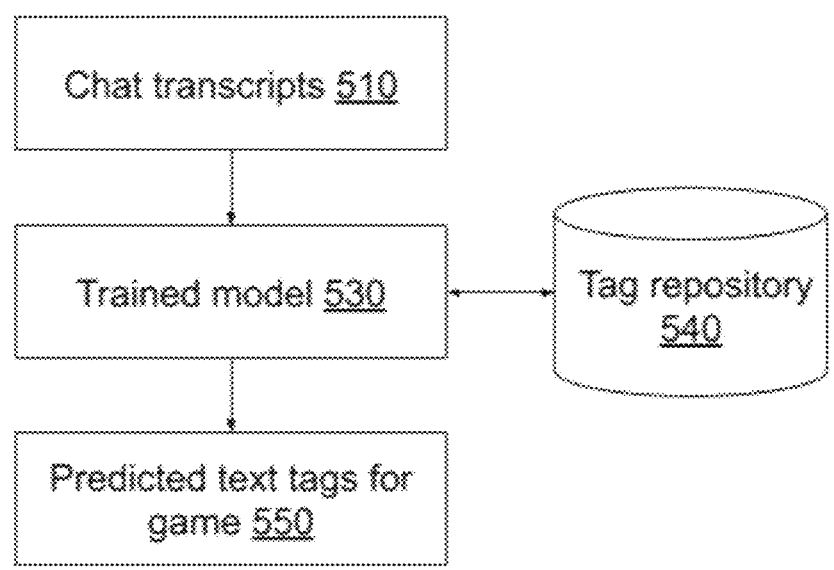
FIG. 5 is a block diagram illustrating an example of generation of text tags for games based on a trained machine learning (ML) model, in accordance with some implementations.

FIG. 5 is a block diagram illustrating an example of generation of text tags for games based on a trained machine learning (ML) model, in accordance with some implementations.

In some implementations, the trained machine learning model 530 is utilized for the generation of text tags 550 based on gameplay session chat transcripts 510, as permitted by the user. A tag repository 540 may be utilized to store a plurality of text tags. Predicted text tags 550 are generated based on the chat transcripts 510.

In some implementations, the ML model is an unstructured word embedding model, e.g. a FastText or Word2Vec model.

In some implementations, the ML model is a neural network. In some implementations, the ML model may include one or more of binary classification, multiclass classification, and regression. In some implementations, the ML model may be a K-means model, kNN model, Linear Regression model, Logistic Regression model, Decision Tree model, SVM model, Naive Bayesian model, Random Forest model, etc.

In some implementations, different ML models may be utilized for different classes of chat transcripts. In some implementations, the same ML model may be utilized across all chat transcripts.

In some implementations, the predicted text tags may be determined based on agreement of predicted tags based on different types (classes) of chat transcripts. For example, a text tag may be predicted when predictions from two or more types of chat transcripts lie within a predetermined distance. In some implementations, a text tag may be predicted when predictions from three or more types of chat transcripts lie within a predetermined distance.

In some implementations, weights may be assigned to predictions based on different chat transcripts, and a weighted score may be utilized to determine a predicted tag by the ML model.

In some implementations, text tags provided by users (developers) may be validated by the ML model to ensure that malicious developers do not provide misleading text tags that are not supported by game characteristics. For example, if a certain type/category of game is very popular, a game developer may attach a tag to their game that indicates that the game belongs to the popular game category, when in reality, it may not include characteristics corresponding to the popular game category.

Figure 6:
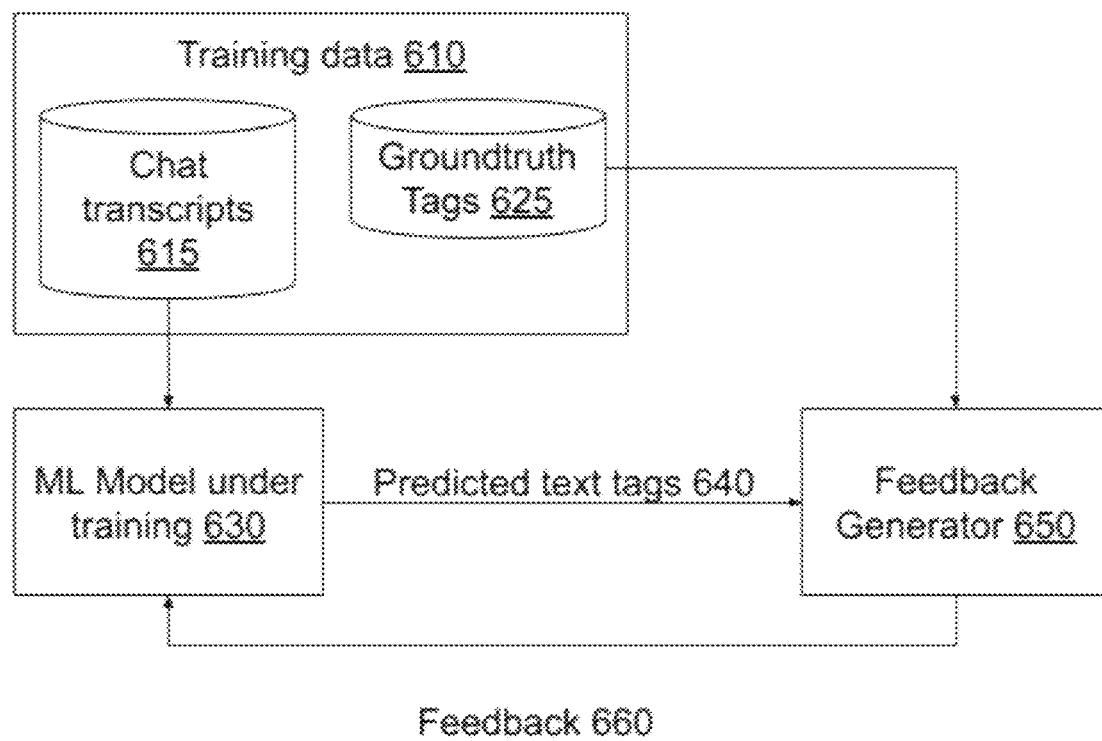
FIG. 6 is a block diagram illustrating an example of supervised machine learning (ML) to generate text tags for games from chat transcripts, in accordance with some implementations.

FIG. 6 is a block diagram illustrating an example of training a machine learning model using supervised learning for text tag generation from user-permitted chat transcripts or from synthetically generated chat transcripts, in accordance with some implementations.

The supervised learning can be implemented on a computer that includes one or more processors and memory with software instructions. In some implementations, the one or more processors may include one or more of a general purpose central processing unit (CPU), a graphics processing unit (GPU), a machine-learning processor, an application-specific integrated circuit (ASIC), a field-programmable gate array (FPGA), or any other type of processor.

In this illustrative example, supervised learning is used to train a machine learning (ML) model 630 based on training data 610 and a feedback generator 650. ML model 630 may be implemented using any suitable machine learning technique, e.g., a feedforward neural network, a convolutional neural network, or any other suitable type of neural network. In some implementations, other machine learning techniques such as Bayesian models, support vector machines, hidden Markov models (HMMs), etc. can also be used to implement ML model 630.

The training data 610 includes chat transcripts 615 (user-permitted and/or synthetically generated) and groundtruth tags 625 for a plurality of games. The chat transcripts may include any chat transcripts, e.g. described with respect to FIG. 3. The groundtruth text tags may be obtained from tags provided by the developers of the games, game players, or other human users.

In this illustrative example, chat transcripts 615 are provided to a machine learning (ML) model under training 630. The ML model generates a set of predicted tags 640 based on a current state of the ML model and the chat transcripts. For example, the ML model may determine a feature vector (or embedding) based on features of chat transcripts 615. The feature vector (or embedding) may be a mathematical, multi-dimensional representation generated based on the chat transcripts 615. Different games may have different feature vectors, based on respective chat transcripts. Upon training, the ML model generates similar feature vectors for similar games (games that are associated with similar types of chat transcripts).

Analysis based on individual components of the chat transcripts can lead to inaccurate determination of game content. Instead, analysis of the chat transcripts when considered as a whole can lead to likely accurate determination of game content. Similar gameplay from multiple games would include similar chat transcript messages in a feature space that is revealed by analyzing the game features using the ML model. Each chat transcript and/or combinations of the chat transcripts could be used as a feature that is input to an ML model. The features are utilized by the ML model to cluster games and generate predicted tags associated with the games.

Stated another way, the chat transcripts may be used to determine characteristics of the game that may be used to determine the text tags for the game. ML model 630 may utilize the feature vectors to generate the text tags for the game. For example, chat transcripts of a game that includes participant (user) conversation about maps, targets, weapons, may be indicative that the game relates to a survival or a battle royal game. In another example, chat transcripts that include user conversation about cars, speed, horsepower, etc. may be indicative that the game relates to a racing game.

For example, a first game may include chat transcripts that includes references to maps, targets, weapons, etc. and has a high volume of text messages between member participants of two groups (teams) of participants, while a second game may have chat transcripts with no recorded user communications. ML model 630 may generate feature vectors that are significantly apart for these two example games based on the games not having chat transcripts that have similarity. On the other hand, for a third game that includes chat transcripts with user communication references to team spirit, mountains, tents, hiking. etc., and a high volume of text messages between member participants of two groups (teams) of participants, the generated feature vector may be similar to that of the first game.

ML model 630 may generate game text tags based on the chat transcripts associated with the game, e.g., based on the feature vector, and/or based on similarity with feature vectors of other games and tags associated with those other games. For example, ML model 630 may generate a "team collaborative" or "social-collaborative" tag for the first and the third games, and a "non-social" tag for the second game.

The predicted tags 640 generated by ML model 630 are provided to feedback generator 650.

Feedback generator 650 is also provided with the groundtruth tags 625 (e.g. human-curated tags) corresponding to the game. Feedback 660 is generated by feedback generator 650 based on a comparison of the predicted tags with the groundtruth tags. For example, if predicted tags 640 are similar to groundtruth tags 625, positive feedback may be provided as feedback 660, while if the tags are dissimilar negative feedback is provided to the ML model under training, which may be updated based on the received feedback using reinforcement learning techniques.

In some implementations, the ML model includes a shallow Word2Vec/FastText architecture or a BERT architecture.

In some implementations, the ML model includes one or more neural networks. The neural network(s) may be organized into a plurality of layers including a plurality of layers. Each layer may comprise a plurality of neural network nodes. Nodes in a particular layer may be connected to nodes in an immediately previous layer and nodes in an immediately next layer. In some implementations, the ML model may be a convolutional neural network (CNN).

In some implementations, the chat transcripts are all processed simultaneously by a single ML model. In some implementations, a particular type of the chat transcripts are processed by a first ML model, while another subset of chat transcripts may be processed by a second ML model, yet another subset of chat transcripts may be processed by a third ML model, etc. For example, the voice transcripts may be processed by a first ML model, the text transcripts by a second ML model, etc.

In some implementations, different types of ML models may be utilized to process different categories of chat transcripts and identify characteristics in each category of chat transcript. The identified characteristics may then be processed by a different ML model that operates on these intermediate outputs as its inputs to generate the predicted tags.

The training of the ML model may be performed periodically at specified intervals, or be triggered by events. In some implementations, the training may be repeated until a threshold level of text tag prediction accuracy is reached.

In some implementations, the chat transcripts may be preprocessed prior to being provided to the ML model. For example, in some implementations, stop words, chat transcript content detected to be spam, chat transcript content detected to have originated from a bot, extraneous text, etc. may be removed before being provided to the ML model. In some implementations, the chat transcript content may be grouped into chunks before being provided to a BERT model.

Figure 7:
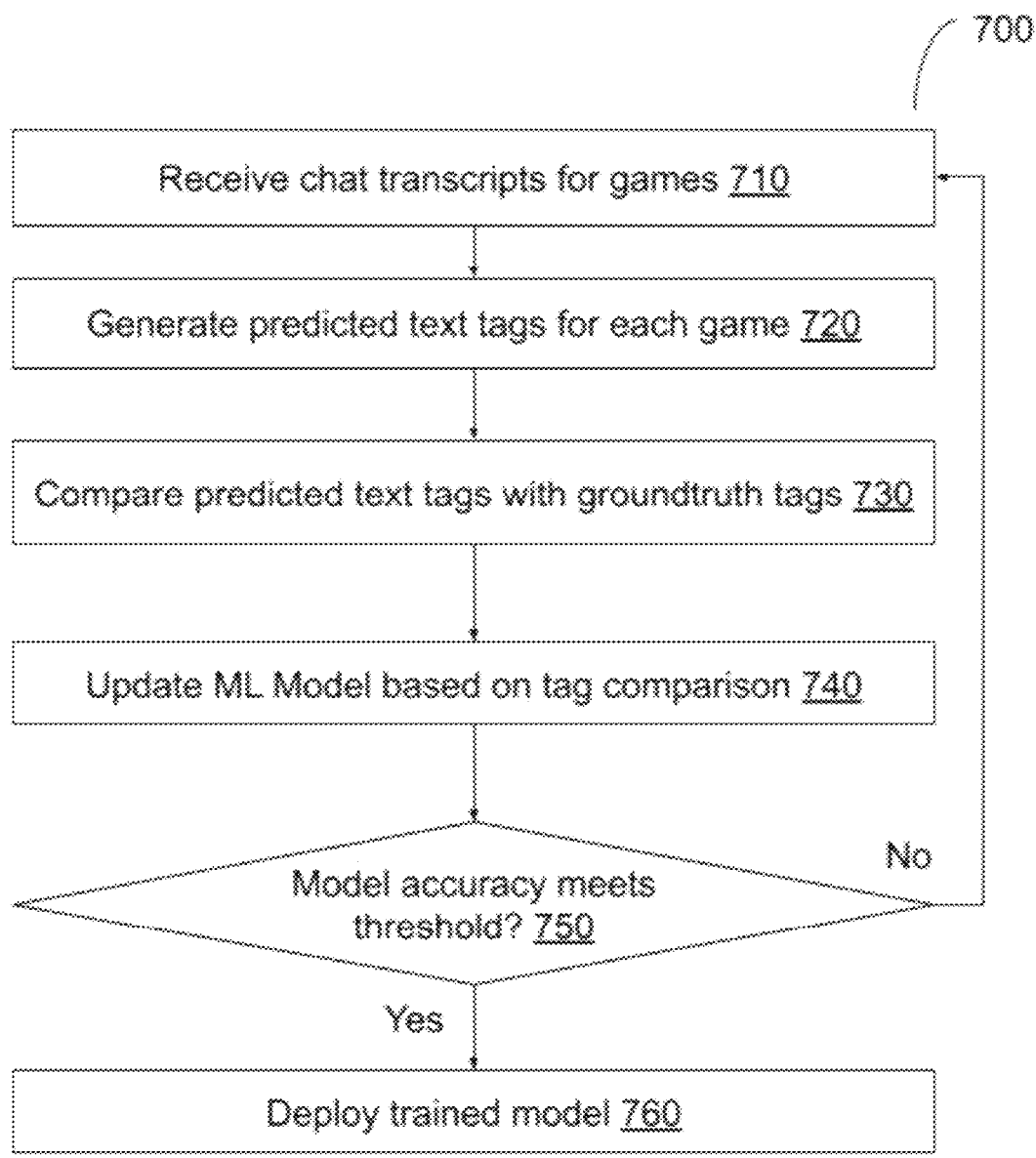
FIG. 7 is a flowchart illustrating an example method to train a machine learning (ML) model to generate text tags from chat transcripts, in accordance with some implementations.

FIG. 7 is a flowchart illustrating an example method to train a machine learning model for text tag generation, in accordance with some implementations.

In some implementations, method 700 can be implemented, for example, on gaming server 102 described with reference to FIG. 1. In some implementations, some or all of the method 700 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a datastore 120 or other storage). In some implementations, different components of one or more servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

In some implementations, the method 700, or portions of the method, can be initiated automatically by a system. In some implementations, the implementing system is a first device. For example, the method (or portions thereof) can be periodically performed, or performed based on one or more particular events or conditions, e.g., an accuracy of text tag prediction falling below a threshold, a predetermined time period having expired since the last performance of method 700, and/or one or more other conditions occurring which can be specified in settings read by the method. If the user denies permission for use of chat transcripts, or if chat transcripts are unavailable for other reasons, method 700 is not performed, such that text tags for games are not determined based on chat information.

Method 700 may begin at block 710. At block 710, chat transcripts associated with various games, obtained with specific user permission, are provided as input to the machine learning model. With user permission, the data includes a plurality of game identifiers, and a respective set of chat transcripts associated with each game identified by the game identifiers. For example, a title or alphanumeric code associated with a game, and a set of chat transcripts, e.g. text messages, voice messages, etc. may be provided as input to the ML model.

As described earlier, the chat transcripts may include 1:1 text messages, N:N text messages, and/or voice messages, as permitted by the user. When the user provides permission, the chat transcript may also include additional information such as avatar use by participants, participant/avatar location during the gameplay session, timestamps, etc. Block 710 may be followed by block 720.

At block 720, predicted text tags are generated by the ML model based on the chat transcripts for the game identified by the game identifiers and a current state of the ML model.

In implementations using a neural network, a respective feature vector may be generated for each game identified by the game identifiers based on the respective set of chat transcripts. In some implementations, the machine learning model includes one or more input neural networks and an output neural network. The respective feature vector(s) are generated using the one or more input neural networks and the respective feature vector(s) may be provided as inputs to the output neural network. Block 720 may be followed by block 730.

At block 730, the predicted text tags are compared to groundtruth tags. For example, one or more predicted text tags for the game identified by the game identifier is compared to respective groundtruth tags associated with the game. An accuracy of text tag prediction is determined for each game, e.g. it is evaluated whether the ML model successfully predicted text tags for each game based on the provided chat transcripts. A loss value is determined based on the accuracy of text tag predictions. Block 730 may be followed by block 740.

At block 740, the ML model is updated based on feedback generated from the comparison of the predicted tags and the groundtruth tags. For example, the loss value is utilized to adjust one or more parameters of the ML model. For example, when the ML model is implemented using a neural network, the weight associated with one or more nodes of the neural network and/or a connection between one or more pairs of nodes of the neural network may be adjusted based on the loss value. In some implementations, a weight associated with a link between a pair of nodes of the neural network may be adjusted. Block 740 may be followed by block 750.

At block 750, an accuracy of the ML model is determined based on cumulative results, and compared to a threshold. For example, the tags generated by the ML model may be compared against groundtruth tags to determine the accuracy. In another example, the tags generated by the ML model may be used to display a user interface to game platform users and the effectiveness of the tags be measured (e.g., based on clickthrough rate for the tags, gameplay generated by the user interface that includes the tags generated the ML model vs. tags obtained in other ways in a AB testing configuration, human evaluation, etc.) If the accuracy meets a threshold, the trained ML model is determined to be suitable for deployment and processing proceeds to block 770, else, the ML model training is continued and processing reverts to 710.

In some implementations, the ML model is trained jointly by utilizing different types/classes of transcripts, e.g. group chat messages, voice messages, etc. In some implementations, different classes/types of transcripts may be blocked (chunked) separately, prior to being jointly provided to the ML model.

At block 770, the trained ML model may be deployed for the generation of text tags for games.

Method 700, or portions thereof, may be repeated any number of times using additional inputs. For example, blocks 720 and 730 may be repeated with multiple sets of groundtruth text tags. In another example, block 710-750 may be repeated with additional games. Method 700 may be repeated until a threshold level of text tag prediction accuracy is reached.

In some implementations, method 700, or portions thereof, may be repeated periodically. For example, method 700, or portions thereof may be repeated to retrain the ML model daily, weekly, monthly, etc. In some implementations, method 700, or portions thereof, may be repeated based on a change in game ratings, e.g. change in ratings of top/popular games on the game platform, or based on code base changes, game digital asset changes, etc. of games. In some implementations, method 700 may be repeated based on the addition of new text tags.

Figure 8:
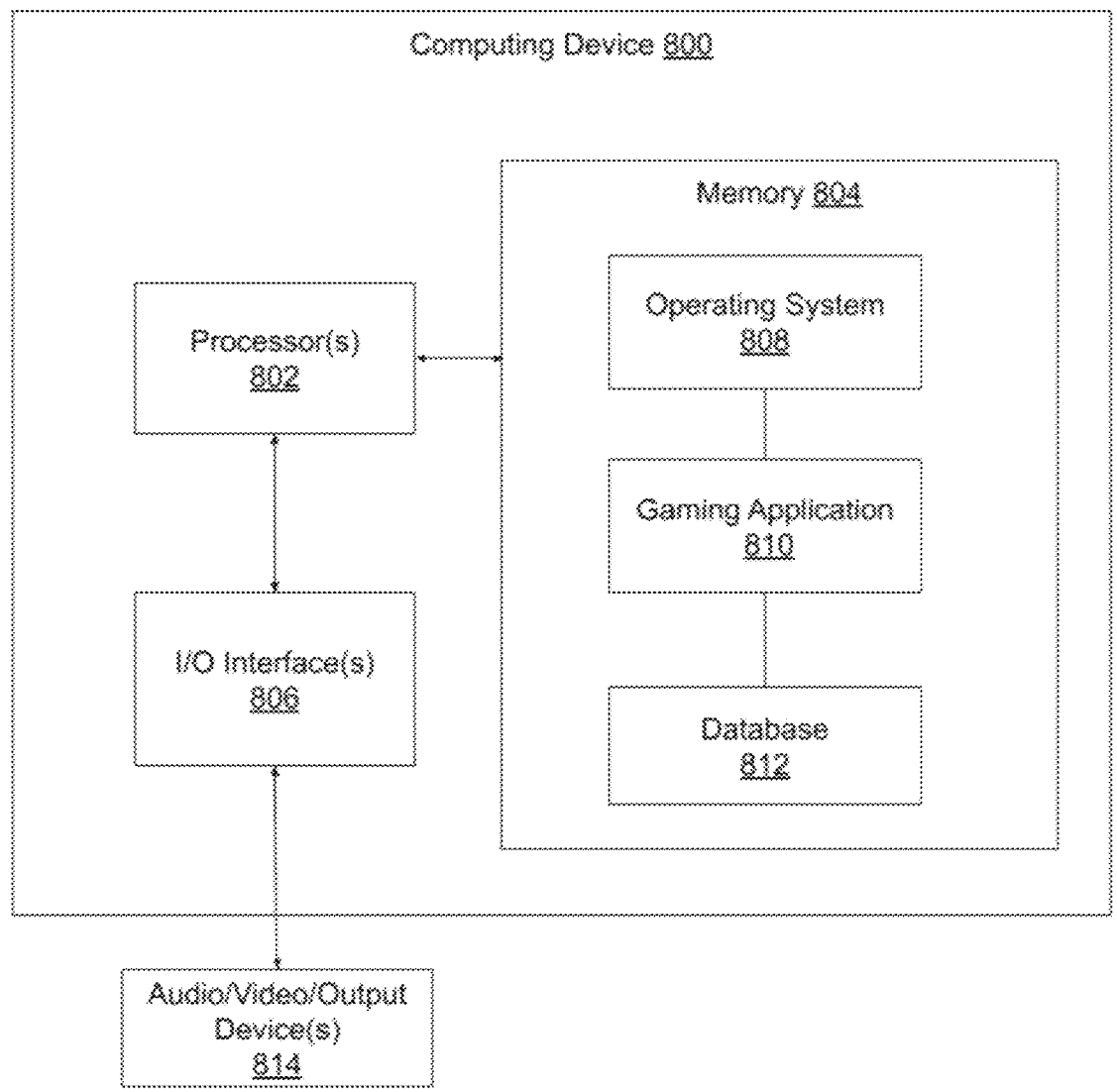
FIG. 8 is a block diagram illustrating an example computing device, in accordance with some implementations.

FIG. 8 is a block diagram of an example computing device 800 which may be used to implement one or more features described herein. In one example, device 800 may be used to implement a computer device (e.g. 102 and/or 110 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, one or more applications 810, e.g., an audio spatialization application and application data 812. In some implementations, application 810 can include instructions that enable processor 802 to perform the functions (or control the functions of) described herein, e.g., some or all of the methods described with respect to FIGS. 4 and 7.

For example, applications 810 can include an audio spatialization module 812, which as described herein can provide audio spatialization within an online gaming server (e.g., 102). Elements of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 120), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 814 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software engines. In other implementations, device 800 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 400 and 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

In addition to the foregoing description, users of the game platform are provided with controls that enable the user to select if and when systems, programs, or features described herein may enable collection of user information, e.g., information obtained from device sensors of a user device, a user's chat data, a user's preferences, a user's current location. The user can selectively deny permission for various types of user data. User data is used only as permitted by the user. Further, user data may be processed before it is stored and/or used. For example, such processing can ensure that personally identifiable information is removed from the user data. For example, a user's identity may be treated so that no personally identifiable information can be determined for the user. In another example, geographic location is generalized where location information is obtained (such as to a city, ZIP code, or state level), so that a particular location cannot be determined. Thus, the user is provided with control over what information is collected about the user, how that information is used, and what information is provided to the user.

What is claimed is:

1. A computer-implemented method to generate one or more text tags, the method comprising:
    obtaining a plurality of chat transcripts, each chat transcript associated with a respective gameplay session of a respective game of a plurality of games, wherein each chat transcript includes content provided by participants in the gameplay session;
    programmatically analyzing the plurality of chat transcripts to determine one or more characteristics for each game of the plurality of games; and
    generating a text tag for at least one game of the plurality of games based on the one or more characteristics of the at least one game.

2. The computer-implemented method of claim 1, further comprising providing a user interface that enables users to browse or search games, wherein the user interface includes a plurality of games and corresponding text tags.

3. The computer-implemented method of claim 1, wherein programmatically analyzing the plurality of chat transcripts to determine one or more characteristics of the each game comprises determining a numerical metric associated with the each game.

4. The computer-implemented method of claim 3, wherein determining the numerical metric comprises determining a number of messages in each of the plurality of chat transcripts, and wherein the numerical metric is based on the number of messages.

5. The computer-implemented method of claim 4, wherein determining the number of messages includes determining the number of messages in each transcript per time period or the number of messages in each transcript by each participant.

6. The computer-implemented method of claim 1, wherein programmatically analyzing the plurality of chat transcripts to determine one or more characteristics of the each game comprises determining a social metric associated with the each game based on the plurality of chat transcripts.

7. The computer-implemented method of claim 6, wherein determining the social metric comprises determining a number of words in each message of each of the chat transcripts and wherein the social metric is based on the number of words.

8. The computer-implemented method of claim 6, wherein determining the social metric comprises performing text analysis of each message of each of the chat transcripts.

9. The computer-implemented method of claim 1, wherein programmatically analyzing the plurality of chat transcripts comprises applying a trained machine learning model to obtain the one or more characteristics for the each game.

10. The computer-implemented method of claim 1, wherein the text tag is indicative of a social game if the one or more characteristics of the each game meets a social game threshold.

11. The computer-implemented method of claim 1, further comprising:
    determining a level of collaboration and a level of competition between the game participants based on the one or more characteristics of the each game; and
    wherein generating the one or more text tags is based on the level of collaboration and the level of competition.

12. The computer-implemented method of claim 1, further comprising:
    calculating a reception level for the each game based on a count of game participants that view one or more chat messages in a chat transcript associated with the each game.

13. The computer-implemented method of claim 12, wherein the game includes a virtual environment and wherein game participants included in the count of game participants are associated with avatars that are located in a same region of the virtual environment.

14. The computer-implemented method of claim 1, wherein programmatically analyzing the plurality of chat transcripts comprises determining statistical parameters based on a number of messages in each of the plurality of chat transcripts, wherein the statistical parameters include one or more of a mean, a median, or a mode of the number of messages associated with each game participant.

15. The computer-implemented method of claim 14, further comprising determining a level of participation of game participants based on the statistical parameters.

16. A non-transitory computer-readable medium comprising instructions that, responsive to execution by a processing device, causes the processing device to perform operations comprising:
   obtaining a plurality of chat transcripts, each chat transcript associated with a respective gameplay session of a respective game of a plurality of games, wherein each chat transcript includes content provided by participants in the gameplay session;
   programmatically analyzing the plurality of chat transcripts to determine one or more characteristics for each game of the plurality of games; and
   generating a text tag for at least one game of the plurality of games based on the one or more characteristics of the at least one game.

17. The non-transitory computer-readable medium of claim 16, wherein programmatically analyzing the plurality of chat transcripts to determine one or more characteristics of the each game comprises determining a social metric associated with the each game based on the plurality of chat transcripts.

18. The non-transitory computer-readable medium of claim 16, wherein the text tag is indicative of a type of the game or a style of game play.

19. A system comprising:
   a memory with instructions stored thereon; and
   a processing device, coupled to the memory, the processing device configured to access the memory and execute the instructions, wherein the instructions cause the processing device to perform operations including:
   obtaining a plurality of chat transcripts, each chat transcript associated with a respective gameplay session of a respective game of a plurality of games, wherein each chat transcript includes content provided by participants in the gameplay session;
   programmatically analyzing the plurality of chat transcripts to determine one or more characteristics for each game of the plurality of games; and
   generating a text tag for at least one game of the plurality of games based on the one or more characteristics of the at least one game.

20. The system of claim 19, wherein programmatically analyzing the plurality of chat transcripts comprises applying a trained machine learning model to obtain the one or more characteristics for the each game.

21. The system of claim 19, wherein programmatically analyzing the plurality of chat transcripts comprises determining statistical parameters based on a number of messages in each of the plurality of chat transcripts, wherein the statistical parameters include one or more of a mean, a median, or a mode of the number of messages associated with each game participant.

* * * * *